US012363581B2

(12) United States Patent
Chung et al.

(10) Patent No.: US 12,363,581 B2
(45) Date of Patent: Jul. 15, 2025

(54) ELECTRONIC DEVICE FOR PROCESSING MASSIVE DATA IN OPEN RADIO ACCESS NETWORK AND OPERATION METHOD THEREOF

(71) Applicant: SAMSUNG ELECTRONICS CO., LTD., Suwon-si (KR)

(72) Inventors: Seungwook Chung, Suwon-si (KR); Daeken Kwon, Suwon-si (KR); Wansu Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 17/962,400

(22) Filed: Oct. 7, 2022

(65) Prior Publication Data

US 2023/0110771 A1    Apr. 13, 2023

Related U.S. Application Data

(63) Continuation of application No. PCT/KR2022/013424, filed on Sep. 7, 2022.

(30) Foreign Application Priority Data

Oct. 8, 2021  (KR) .......................... 10-2021-0134418
Dec. 7, 2021  (KR) .......................... 10-2021-0173884

(51) Int. Cl.
*H04W 28/02* (2009.01)
*H04W 88/14* (2009.01)
(Continued)

(52) U.S. Cl.
CPC ... *H04W 28/0242* (2013.01); *H04W 28/0278* (2013.01); *H04W 28/0284* (2013.01);
(Continued)

(58) Field of Classification Search
CPC ....... H04W 4/50–80; H04W 8/00–245; H04W 88/08–188
See application file for complete search history.

(56) References Cited

U.S. PATENT DOCUMENTS

| 6,182,146 B1 | 1/2001 | Graham-Cumming, Jr. |
| 11,337,131 B1 * | 5/2022 | Parekh .................. H04W 36/22 |

(Continued)

FOREIGN PATENT DOCUMENTS

| CN | 111510959 | 8/2020 |
| EP | 3869847 | 8/2021 |

(Continued)

OTHER PUBLICATIONS

Search Report and Written Opinion dated Dec. 13, 2022 issued in International Patent Application No. PCT/KR2022/013424.
(Continued)

*Primary Examiner* — San Htun
(74) *Attorney, Agent, or Firm* — Nixon & Vanderhye, P.C.

(57) ABSTRACT

An example electronic device configured to operate as a radio access network (RAN) intelligent controller (RIC) in an open RAN (O-RAN) is disclosed. The electronic device may include a communication interface including communication circuitry configured to support an E2 interface, and a processor operatively coupled with the communication interface and configured to: store a routing table for managing connectivity between a first application and a plurality of RAN nodes configured to communicate with the RIC over the E2 interface, detect an overload of the first application, generate a second application configured to execute a same function as the first application, update the routing table to include connectivity between at least one of the plurality of RAN nodes and the second application, and control the communication interface to forward messages from the
(Continued)

plurality of RAN nodes to the first application and the second application based on the updated routing table.

20 Claims, 14 Drawing Sheets

(51) Int. Cl.
    *H04W 88/16*     (2009.01)
    *H04W 88/18*     (2009.01)

(52) U.S. Cl.
    CPC ........... *H04W 88/14* (2013.01); *H04W 88/16* (2013.01); *H04W 88/18* (2013.01)

(56) References Cited

U.S. PATENT DOCUMENTS

| | | | |
|---|---|---|---|
| 2004/0148605 A1 | 7/2004 | Kim | |
| 2021/0204148 A1* | 7/2021 | Chou | H04W 24/02 |
| 2021/0234803 A1 | 7/2021 | Parekh et al. | |
| 2021/0235277 A1* | 7/2021 | Parekh | H04W 16/14 |
| 2021/0258866 A1 | 8/2021 | Chou | |
| 2021/0377804 A1* | 12/2021 | Sivaraj | H04W 76/15 |
| 2022/0159525 A1* | 5/2022 | Chou | H04W 36/22 |
| 2022/0225264 A1 | 7/2022 | Song et al. | |
| 2023/0239824 A1* | 7/2023 | Teshima | H04W 56/0055 370/350 |

FOREIGN PATENT DOCUMENTS

| | | |
|---|---|---|
| KR | 10-2000-0012756 | 3/2000 |
| KR | 10-2004-0069059 | 8/2004 |
| KR | 10-2006-0066603 | 6/2006 |
| KR | 10-2010-0060304 | 6/2010 |
| KR | 10-2017-0044926 | 4/2017 |
| KR | 10-2021-0039310 | 4/2021 |

OTHER PUBLICATIONS

Czichy, "5G RAN optimization using the O-RAN software community's RIC (RAN Intelligent Controller)", dated Sep. 23, 2019, 23 pages.

"Feasibility of Open-Source for 5G", dated Jul. 1, 2021, 129 pages.

Everything You Need to Know about Open RAN, Parallel wireless, dated Jan. 1, 2020, 63 pages.

Extended Search Report dated Dec. 17, 2024 in European Patent Application No. 22878740.4.

\* cited by examiner

|         | 602 | 604 | 606 |
|---------|-----|-----|-----|
| RIC Request ID | RAN Node | App EndPoint |
| 1 | RAN Node #1 | App #A-1 |
| 1 | RAN Node #2 | App #A-1 |
| ... | ... | ... |
| 1 | RAN Node #99 | App #A-1 |
| 1 | RAN Node #100 | App #A-1 |

FIG. 6A

| RIC Request ID | RAN Node | App EndPoint |
|---|---|---|
| 1 | RAN Node #1 | App #A-1 |
| 1 | RAN Node #2 | App #A-1 |
| ... | ... | ... |
| 1 | RAN Node #99 | App #A-2 |
| 1 | RAN Node #100 | App #A-2 |

FIG. 6B

ELECTRONIC DEVICE FOR PROCESSING MASSIVE DATA IN OPEN RADIO ACCESS NETWORK AND OPERATION METHOD THEREOF

CROSS-REFERENCE TO RELATED APPLICATIONS

This application is a continuation of International Application No. PCT/KR2022/013424 designating the United States, filed on Sep. 7, 2022, in the Korean Intellectual Property Receiving Office and claiming priority to Korean Patent Application No. 10-2021-0134418, filed on Oct. 8, 2021, in the Korean Intellectual Property Office, and to Korean Patent Application No. 10-2021-0173884, filed on Dec. 7, 2021, in the Korean Intellectual Property Office, the disclosures of all of which are incorporated by reference herein in their entireties.

BACKGROUND

Field

The disclosure relates to an electronic device for processing massive data in an open radio access network (O-RAN) and an operation method thereof.

Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

The next-generation communication standard may be called a 5G mobile network or 5G wireless system, or 5G for short (5G new radio may be referred to as 5G-NR or simply NR). 5G-NR may provide a larger capacity to higher-density mobile broadband users, and support very stable massive machine type communication (MTC) between devices, with lower latency and/or lower battery consumption. Further, 5G-NR may allow more flexible user equipment (UE) scheduling, compared to LTE. There is on-going development of 5G-NR to take advantage of higher throughput available at higher frequencies.

The 5G-NR system developed to meet the demand for wireless data traffic may provide users with a high data rate service, and also provide wireless communication services for various purposes, such as Internet of things (IoT) or a service requiring high reliability for a specific purpose. For a wireless communication network allowing co-existence between a 4G communication system and a 5G communication system, the open radio access network (O-RAN) established by a group of operators and manufacturers defines radio access network (RAN) interfaces and presents an O-RAN architecture to support interoperability between manufacturer devices and network flexibility with a low cost based on the (3GPP) standards.

One of the main components of the O-RAN architecture is a RAN intelligent controller (RIC) that provides an open hosting platform for applications, and controls and optimizes RAN functions. The RIC may manage RAN components (e.g., RAN nodes) in near-real time or non-real time to adjust latency according to requirements. A non-real-time RIC may provide a near-real-time RIC with network data and subscriber data, and a near-real-time RIC may provide real-time optimization for mobility management.

The RIC may execute applications that may be developed by third-party specialized software providers. These applications may be non-real-time machine learning (ML) applications (rApps) running on a non-real-time RIC software platform or near-real-time ML applications (xApps) running on a near-real-time RIC software platform.

The RIC may receive a very large number of report messages provided by massive RAN nodes. When the number of report messages that the RIC receives from the RAN nodes is very large, it may be difficult to guarantee near-real-time processing with a single xApp for such a reason as lack of resources of the xApp. However, when an operation of distributing the load of the xApp is performed in a situation in which the RIC receives report messages from a very large number of RAN nodes, the report messages may be processed with a delay, or some report messages may be dropped or redundant.

Moreover, when the xApp performs an individual load balancing process, the RIC may fail in operating resources and thus experience overall malfunction, because the RIC has difficulty in determining the load of the xApp.

SUMMARY

Embodiments of the disclosure provide electronic device and an operation method thereof that may reduce dropped or duplicate messages and provide a stable application service by supporting low-latency scale-out in a network system to which a low-latency connection is important.

Embodiments of the disclosure provide an electronic device and an operation method thereof that may address message drop caused by a low processing speed resulting from an increase in the amount of data processed in an application or the complexity of a data processing logic of the application by processing a plurality of applications in parallel.

Embodiments of the disclosure provide an electronic device and an operation method thereof that may reduce or minimize the amount of data that is not processed in a single application due to lack of resources or a decreased processing speed, when a radio access network intelligent controller (RIC) manages an increased number of radio access network (RAN) nodes or an individual RAN processes larger data.

Embodiments of the disclosure provide an electronic device and an operation method thereof that may prevent and/or reduce RIC failure caused by indiscriminate scale-out of applications by processing a scale-out operation in a RIC.

According to an embodiment, an electronic device configured to operate as a radio access network (RAN) intelligent controller (RIC) in an open radio access network (O-RAN), the electronic device may include: a communication interface comprising communication circuitry configured to support an E2 interface, and a processor operatively coupled with the communication interface. The processor may be configured to store a routing table for managing connectivity between a first application and a plurality of RAN nodes configured to communicate with the RIC over the E2 interface. The processor may be configured to detect overload of the first application, and generate a second application configured to execute a same function as the first application. The processor may be configured to update the routing table to include connectivity between at least one of the plurality of RAN nodes and the second application. The processor may be configured to control the communication interface to forward messages from the plurality of RAN nodes to the first application and the second application based on the updated routing table.

According to an embodiment, a method performed by a radio access network (RAN) intelligent controller RIC in an open radio access network (O-RAN) may include: storing a routing table for managing connectivity between a first application and a plurality of RAN nodes configured for communicating with the RIC over an E2 interface. The method may include detecting overload of the first application, and generating a second application configured to execute a same function as the first application The method may include updating the routing table to include connectivity between at least one of the plurality of RAN nodes and the second application. The method may include forwarding messages from the plurality of RAN nodes to the first application and the second application based on the updated routing table.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 6A and 6B are diagrams illustrating an example update of a routing table according to one embodiment;

DETAILED DESCRIPTION

The disclosure will be described below in greater detail with reference to the accompanying drawings. Terms as used herein are defined in consideration of functions in the disclosure. Because the terms may vary depending on the intention of a user or operator or customs, the definitions should be made according to the contents throughout this disclosure.

Terms referring to a network entity and components of an open radio access network (O-RAN) system, terms referring to messages, terms referring to information, and so on as used in the disclosure are illustratively provided, for convenience of description. Accordingly, embodiments of the disclosure are not limited to the terms described below, and other terms referring to objects having equivalent technical meanings may be used.

While for convenience of description, the disclosure uses terms and names defined in the O-RAN system standard, the disclosure is not limited by the terms and names and may be equally applied to systems conforming to other standards.

Embodiments of the disclosure will be described below in greater detail with reference to the accompanying drawings. A detailed description of well-known functions and configurations may be avoided where it may obscure the disclosure with unnecessary detail.

Figure 1:
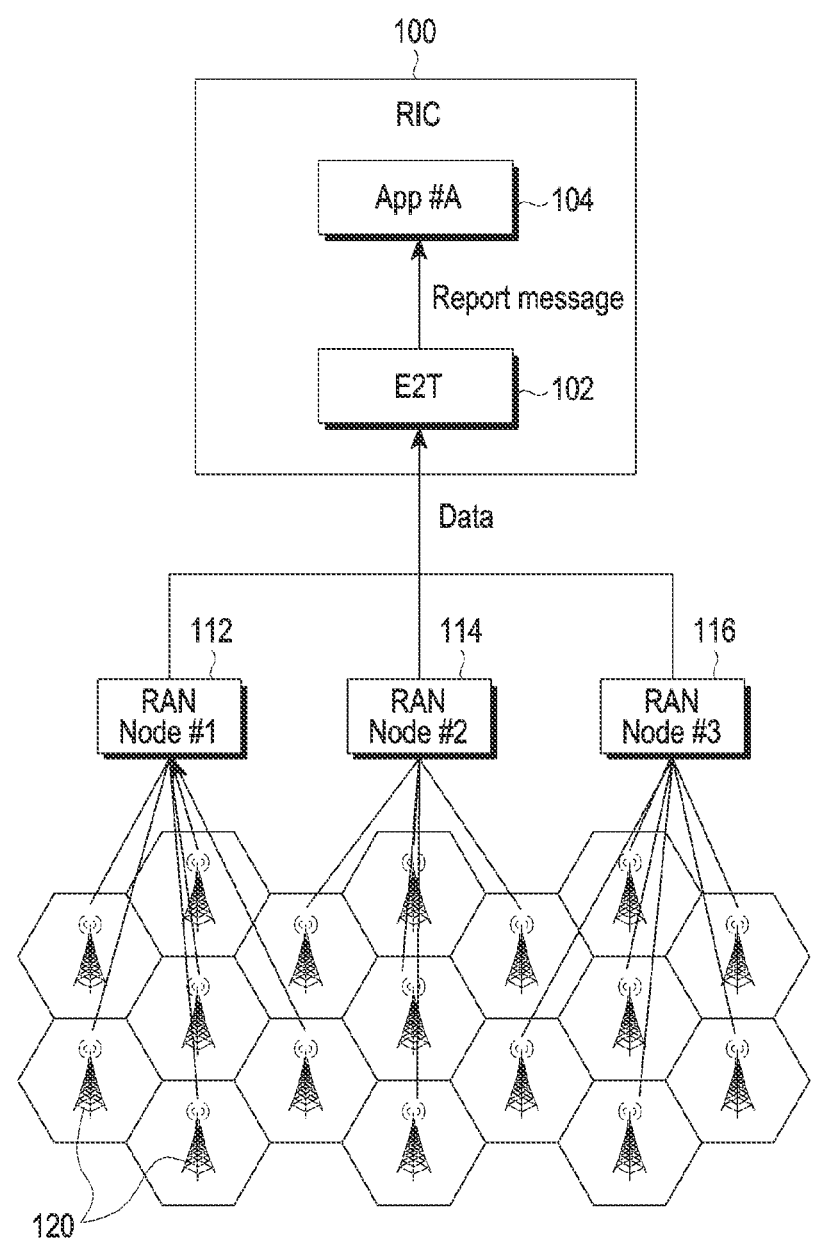
FIG. 1 is a diagram illustrating an example open radio access network (O-RAN) architecture according to one embodiment.

FIG. 1 is a diagram illustrating an example open radio access network (O-RAN) architecture according to one embodiment.

Referring to FIG. 1, one of the components of an O-RAN, a radio access network intelligent controller (RIC) 100 may include an E2 termination (E2T) 102 and at least one application (e.g., App #A) 104. The E2T 102 may be connected to a plurality of RAN nodes 112, 114, and 116 located outside the RIC 100 over an E2 interface. The E2T 102 may collect information from the RAN nodes 112, 114, and 116 and transmit the collected information to the at least one application 104 or may transmit a control message from the at least one application 104 to the RAN nodes 112, 114, and 116. The at least one application 104 may be implemented in software provided by a third party, which collects information from the RAN nodes 112, 114, and 116 through the E2T 102 and controls the RAN nodes 112, 114, and 116.

The RAN nodes 112, 114, and 116 may include at least one of a network element (NE) of a $3^{rd}$ generation partnership project (3GPP)-based $4^{th}$ generation (4G) system, a $5^{th}$ generation (5G) communication system, or a mixed system such as evolved universal terrestrial radio access (E-UTRA) new radio (NR) dual connectivity (EN-DC), a radio unit or remote unit (RU), an evolved Node B (eNB), a distributed unit (DU), a central unit-control plane (CU-CP), or a central unit-user plane (CU-UP). The RAN nodes 112, 114, and 116 may be connected to the E2T 102 of the RIC 100 to report data related to multiple cells (e.g., cells 120) and/or user equipments (UEs) (not shown).

In an embodiment, the E2T 102 may support at least one of the following functions.

The E2T 102 may open or remove a stream control transmission protocol (SCTP) connection with each RAN node 112, 114, or 116.

The E2T 102 may route messages from the at least one application 104 to each RAN node 112, 114, or 116 through the SCTP connection or route messages from each RAN node 112, 114, or 116 to the at least one application 104.

The E2T 102 may process messages related to E2 connectivity.

The E2T 102 may notify the at least one application 104 of a list of RAN functions supported by the RAN nodes 112, 114, and 116 based on an E2 connection configuration and RIC service update.

In an embodiment, the RIC 100 may include a software platform configured as a near-real time type, and execute and host the at least one application 104. The near-real-time type RIC 100 may control components (e.g., the RAN nodes 112, 114, and 116) and resources through more elaborate data collection and communication over the E2 interface, and perform a network optimization operation which may take place, for example, between 10 ms and 1 second.

In an embodiment, the E2 interface may be an implementation of the O-RAN WG3 E2 application protocol (E2AP) standard, and the E2AP may include an E2 service model (E2SM) defining a service model of the RAN nodes 112, 114, and 116. In an embodiment, the RIC 100 and the RAN nodes 112, 114, and 116 may exchange E2AP-based and E2SM-based messages.

In an embodiment, the RIC 100 may use RIC subscription to request the RAN nodes 112, 114, and 116 to transmit messages related to a cell and/or a UE. The RIC 100 may request the RAN nodes 112, 114, and 116 to perform RIC subscription through the E2T 102, and the RAN nodes 112, 114, 116 may subscribe to the RIC 100 according to the request. The RIC 100 may store and manage subscription information about the RAN nodes 112, 114, and 116.

The at least one application (e.g., App #A) 104 may be developed by a third-party software provider and run on the RIC 100. The at least one application (e.g., App #A) 104 may execute functions such as network intelligence, network optimization, and control using report data from the RAN nodes 112, 114, and 116.

Figure 2A:
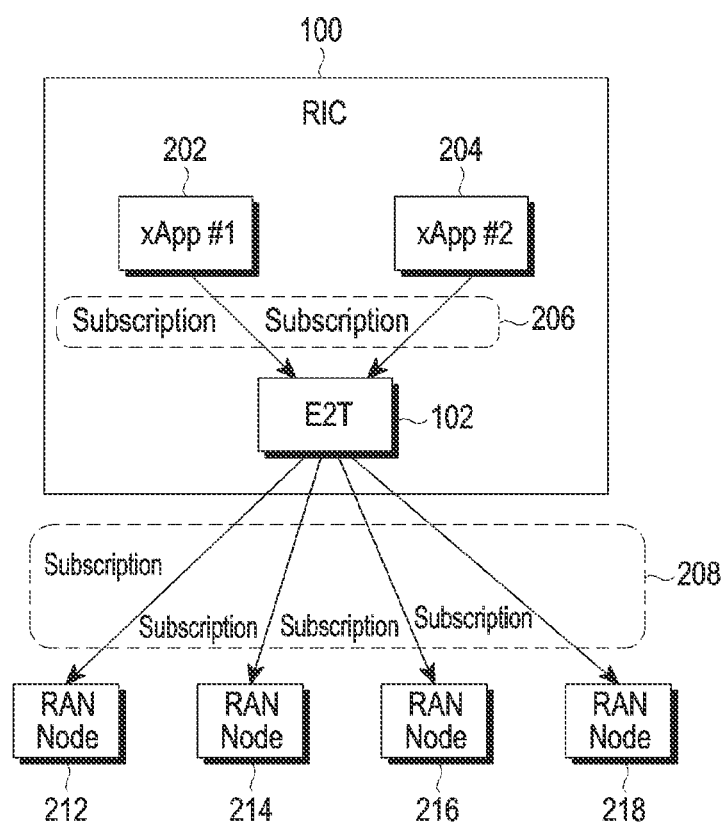
FIGS. 2A and 2B are diagrams illustrating example communication between a random access network (RAN) intelligent controller (RIC) and RAN nodes according to one embodiment.
Figure 2B:
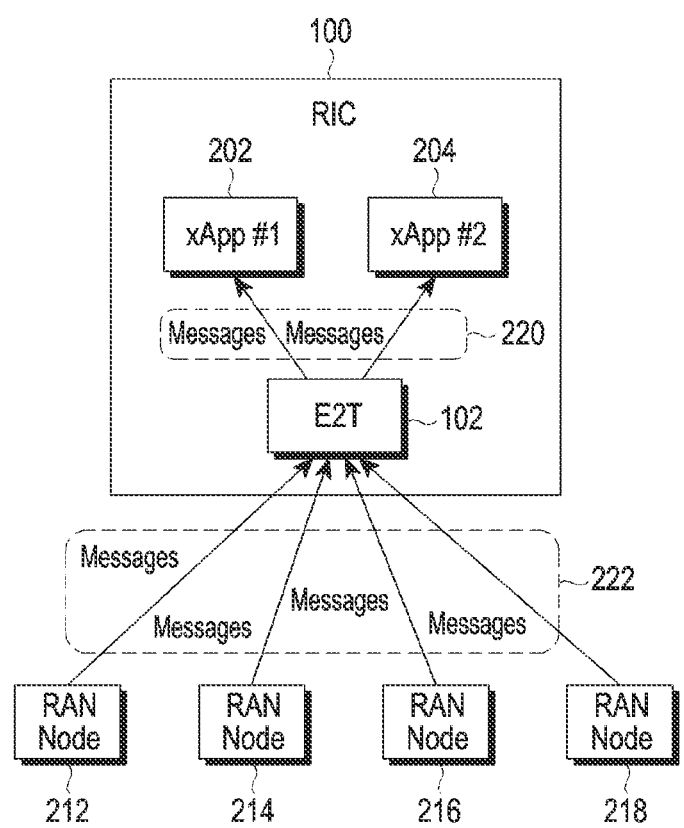

FIGS. 2A and 2B are diagrams illustrating example communication between a RIC and RAN nodes according to one embodiment.

Referring to FIG. 2A, a first application (e.g., xApp #1) 202 and a second application (e.g., xApp #2) 204 inside the RIC 100 may transmit subscription messages 206 to the RIC 100 to receive report messages from RAN nodes 212, 214, 216, and 218 (e.g., which may include at least one of the RAN nodes 112, 114, and 116 of FIG. 1). In an embodiment, at least one of the subscription messages 206 may include information indicating at least one of a target RAN node (e.g., at least one of the RAN nodes 212, 214, 216, and 218) required by the first application 202 or the second application 204, a target function required for the target RAN node, or an event trigger related to the target function.

In an embodiment, the RIC 100 may store and manage subscription information related to the first application 202 and the second application 204 based on the subscription messages 206. The RIC 100 may configure the subscription information such that data reported from the target RAN node may be transmitted (e.g., routed) to the application (e.g., the first application 202 or the second application 204).

In an embodiment, the E2T 102 may transmit subscription messages 208 including information (e.g., the information included in the at least one of the subscription messages 206) received from the at least one application 104 inside the RIC 100 to at least one of the RAN nodes 212, 214, 216, and 218. The RIC 100 may store and manage subscription information related to the RAN nodes 212, 214, 216, and 218 based on the subscription messages 208. In an embodiment, the subscription information related to the RAN nodes 212, 214, 216, and 218 may be identified by a RIC request ID.

In an embodiment, the RAN nodes 212, 214, 216, and 218 may be configured to transmit requested report data to the RIC 100 according to a given event trigger (e.g., a periodic or specific event) based on the subscription messages 208.

Referring to FIG. 2B, upon detection of an event trigger based on the subscription messages 208, each of the RAN nodes 212, 214, 216, and 218 subscribed to the RIC 100 may transmit report messages 222 including report data related to a UE and/or a cell to the RIC 100. The E2T 102 in the RIC 100 may receive the report messages 222 transmitted from RAN nodes 212, 214, 216, and 218. Each of the report messages may identify a specific RIC subscription in the RIC 100, and include a RIC request ID which is a logical ID used to indicate the type of report data that a specific application (e.g., the first application 202 or the second application 204) requests from the RAN nodes 212, 214, 216, and 218.

In an embodiment, the E2T 102 may route the report messages 222 (e.g., at least one of the report messages 222) including report data obtained from the RAN nodes 212, 214, 216, and 218 to at least one of the first application 202 or the second application 204 according to the subscription information stored and managed in the RIC 100.

Connectivity between the applications 202 and 204 in the RIC 100 and the RAN nodes 212, 214, 216, and 218 may be divided into two parts as follows. A first part is connections between the RAN nodes 212, 214, 216, and 218 and the RIC 100 (e.g. the E2T 102), and a second part is connections between the RIC 100 (e.g. the E2T 102) and the applications 202 and 204. In an embodiment, the connections between the RAN nodes 212, 214, 216, and 218 and the RIC 100 (e.g., the E2T 102) may use the SCTP and the E2AP (hereinafter, referred to as SCTP/E2AP) defined by the O-RAN standard. In an embodiment, the connections between the RIC 100 (e.g., the E2T 102) and the applications 202 and 204 may use an application programming interface (API).

In an embodiment, for near-real-time RAN management, which is the purpose of the RIC 100, persistent connections may be used for the connectivity between the RIC 100 and the RAN nodes 212, 214, 216, and 218 and the connectivity between the RIC 100 and the applications 202 and 204. As the persistent connections are used to carry a message whenever an event trigger is detected in the RAN nodes 212, 214, 216, and 218, while continuous data transmissions are always maintained, the persistent connections may reduce inefficiency involved in opening and closing each connection on a message basis.

In an embodiment, the RIC 100 may initiate (e.g., open) connections (e.g., SCTP/E2AP connections) with the RAN nodes 212, 214, 216, and 218 and maintain the connections, and at least one of the RAN nodes 212, 214, 216, and 218 may transmit a report message to the RIC 100 through a corresponding connection, whenever the event trigger is detected. The connections may be maintained continuously until the RIC releases the connections due to deletion of subscriptions of the RAN nodes 212, 214, 216, and 218.

In an embodiment, the RIC 100 may initiate (e.g., open) and maintain connections (e.g., API connections) with the applications 202 and 204, and whenever a report message is received from at least one of the RAN nodes 212, 214, 216, and 218, may transmit the report message to at least one of the applications 202 and 204 through a corresponding connection. The connections may persist until subscriptions of the applications 202 and 204 are released by the RIC 100.

Figure 3:
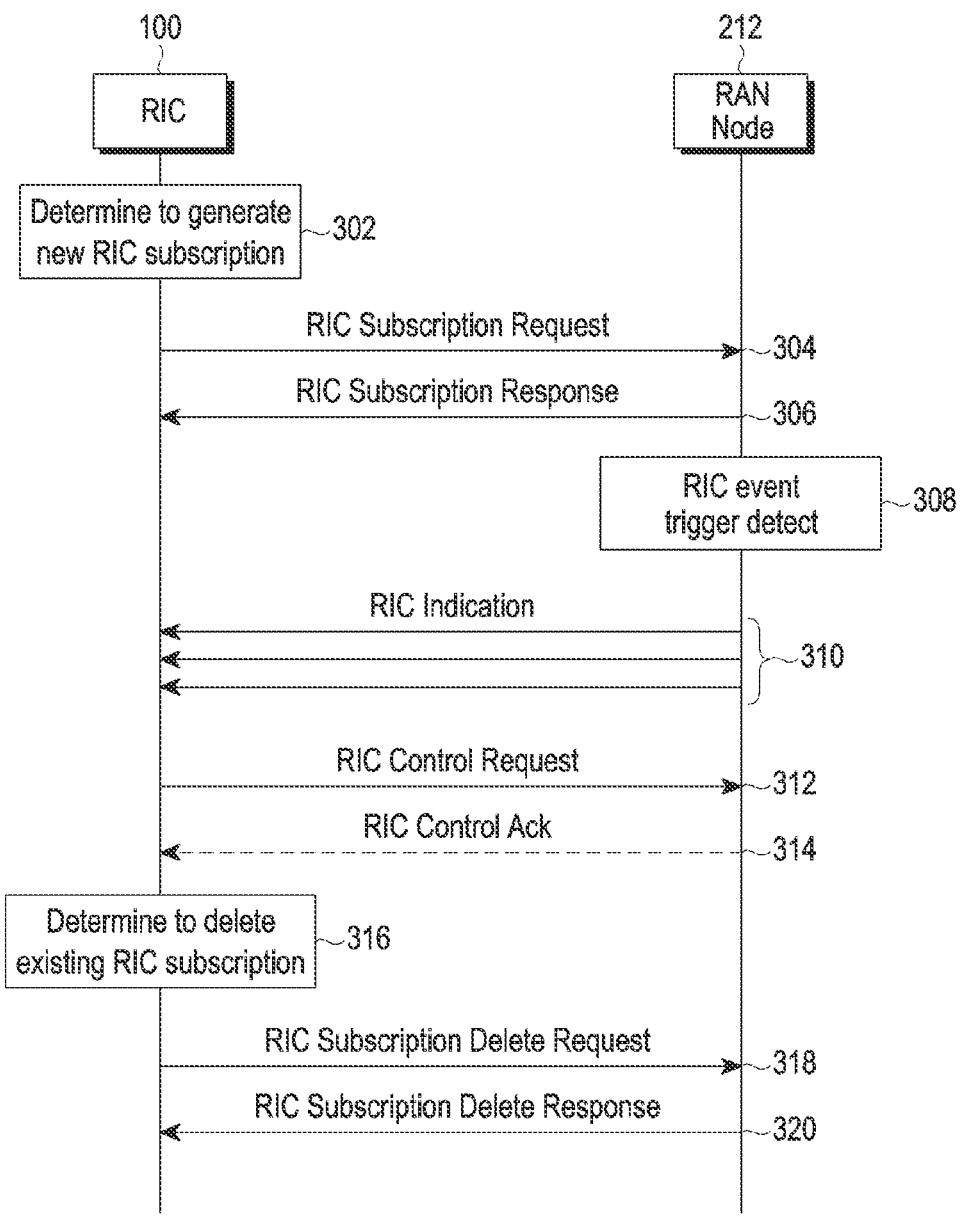
FIG. 3 is a signal flow diagram illustrating an example RIC subscription and subscription deletion procedure according to one embodiment.

FIG. 3 is a signal flow diagram illustrating an example RIC subscription and subscription deletion procedure according to one embodiment.

Referring to FIG. 3, the RIC 100 may determine to generate a new RIC subscription in operation 302. In an embodiment, upon receipt of a subscription request for RIC reporting from at least one application (e.g., xApp #1 202 or xApp #2 204), the RIC 100 may determine to generate a new RIC subscription for at least one RAN node (e.g., the RAN node 212) and proceed to operation 304. The new RIC subscription may be used to configure an event trigger and a target function for the at least one RAN node.

In operation 304, the RIC 100 may transmit a RIC subscription request message to the at least one RAN node (e.g., the RAN node 212). In an embodiment, the RIC subscription request message may include at least one of a unique RIC request ID, a RAN function ID, a definition of a RIC event trigger, or a function list. The definition of the RIC event trigger may define an event that triggers the RAN node 212 to perform a specific function. The function list may include at least one function that the RAN node 212 can perform.

In operation 306, the RAN node 212 may configure a target function and an event trigger in response to the reception of the RIC subscription request message, and transmit a RIC subscription response message to the RIC 100. The RIC subscription response message may include at least one of the same RIC request ID as included in the RIC subscription request message, a RAN function ID, a list of function allowed for the RAN node 212, or a list of functions not allowed for the RAN node 212.

In operation 308, the RAN node 212 may detect the event trigger. The event trigger may be detected based on the function of the RAN node 212 according to a specific E2 service model. In response to the detection of the event trigger, the RAN node 212 may transmit a RIC indication message including report data in operation 310. In an embodiment, the RIC indication message may include at least one of a RIC request ID, a RAN function ID, or a content field indicating report data. In an embodiment, the detection of the event trigger and the transmission of the RIC indication message may be repeated according to a given event trigger condition.

In operation 312 that may be optionally performed, the RIC 100 may transmit a RIC control request message for controlling to start or stop a specific functionality for the RAN node 212. In an embodiment, the RIC control request message may be transmitted according to a request of at least one application (e.g., xApp #1 202 or xApp #2 204). In an embodiment, the RIC control request message may include a RIC request ID, a RAN function ID, and information fields related to RIC control. In operation 312 that may be optionally performed, the RAN node 212 may transmit a RIC control acknowledgment (Ack) message to the RIC 100 and initiate or stop the requested specific functionality.

In operation 316, the RIC 100 may determine to delete an existing RIC subscription (e.g., a RIC subscription related to the RAN node 212). In an embodiment, upon receipt of a request for deleting the RIC subscription from the at least one application (e.g., xApp #1 202 or xApp #2 204), the RIC 100 may determine to delete the requested existing RIC subscription and proceed to operation 318.

In operation 318, the RIC 100 may transmit a RIC subscription delete request message to the at least one RAN node (e.g., the RAN node 212) related to the RIC subscription to be deleted. In an embodiment, the RIC subscription deletion request message may include at least one of a unique RIC request ID or a RAN function ID.

In operation 320, the RAN node 212 may delete an event trigger identified by the RIC request ID included in the RIC subscription delete request message, and transmit a RIC subscription delete response message to the RIC 100.

While not shown, the RAN node 212 may transmit a RIC subscription deletion request message including a RIC request ID and a RAN function ID to the RIC 100 for requesting deletion of a RIC subscription corresponding to the RIC request ID. The RIC 100 may delete at least one RIC subscription related to the RIC request ID and the RAN function ID included in the RIC subscription deletion request message, and release resources related to the at least one RIC subscription.

In an embodiment, the RIC 100 may receive a large number of report messages from a large number of RAN nodes (e.g., including RAN nodes 212, 214, 216, and 218) using subscriptions of the RAN nodes. When the data amount of the report messages received from the large number of RAN nodes increases, a single application (e.g., xApp #1 202 or xApp #2 204) may not have sufficient resources to process the report messages. Therefore, it may be difficult for the RIC 100 to guarantee near-real-time processing of the report messages.

In an embodiment, the RIC 100 may distribute load using one or more applications capable of executing the same function using scale-out. Scale-out may refer to distributing load by additionally generating an application that performs the same operation in a cloud structure. However, because an application (e.g., xApp #1 202 or xApp #2 204) in the RIC 100 and RAN nodes (e.g., the RAN nodes 212, 214, 216, and 218) use persistent connections, the RIC 100 may perform operations illustrated in FIGS. 4A and 4B, for distributed processing using scale-out.

Figure 4A:
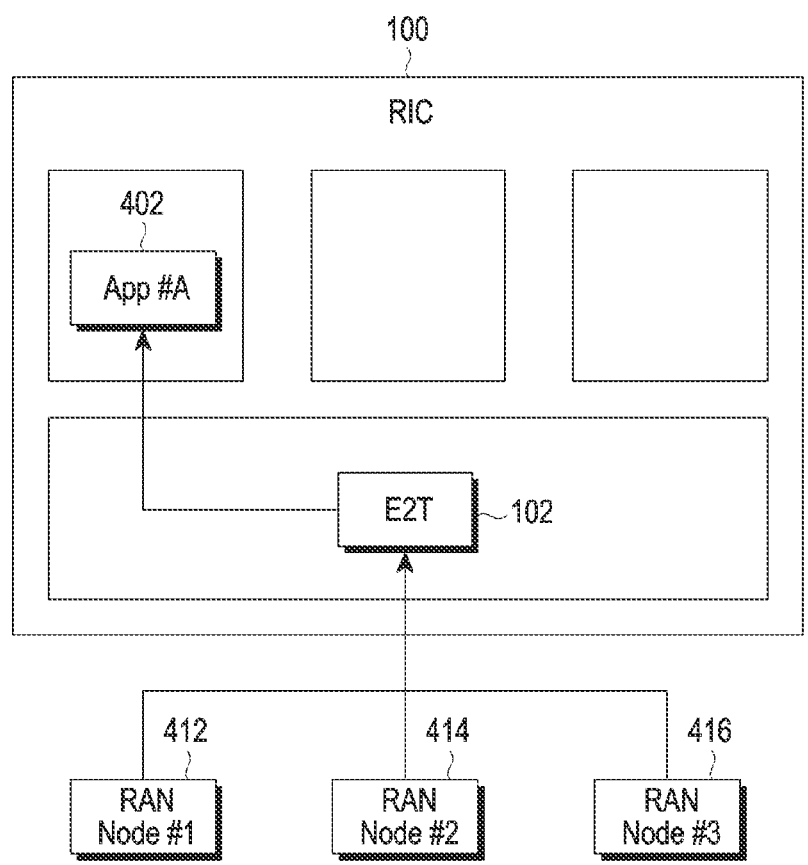
FIGS. 4A and 4B are diagrams illustrating scale-out for distributed processing of an application according to one embodiment.
Figure 4B:
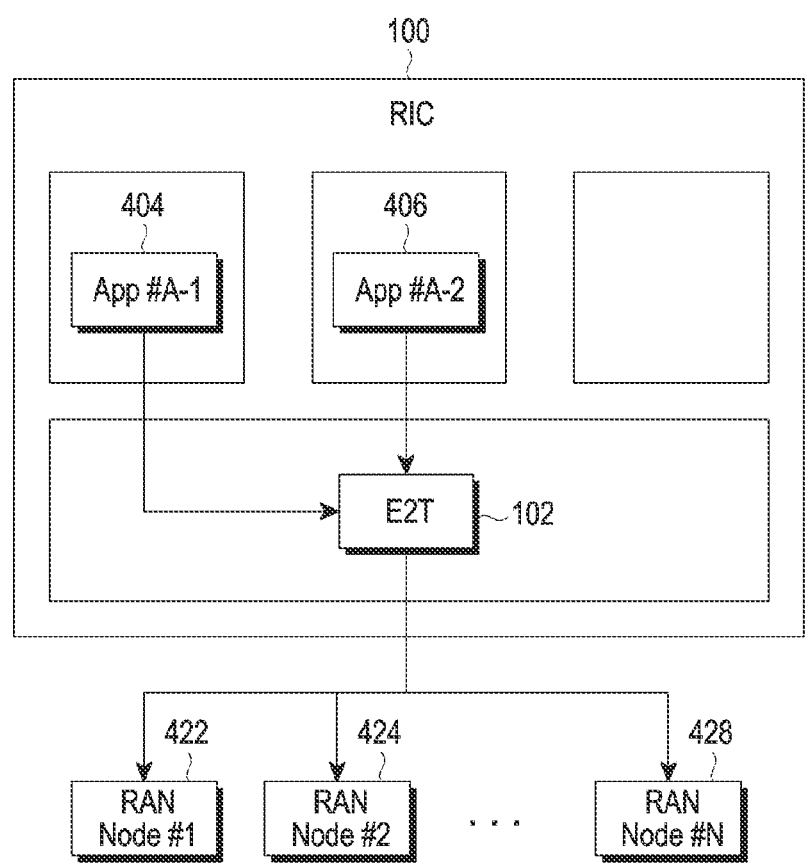

FIGS. 4A and 4B are diagrams illustrating scale-out for distributed processing of an application according to one embodiment.

Referring to FIG. 4A, the RIC 100 may include a single application (e.g., App #A) 402 and be connected with a plurality of RAN nodes, for example, RAN node #1 412, RAN node #2 414, and RAN node #3 416 through the E2T 102. RAN node #1 412, RAN node #2 414, and RAN node #3 416 may subscribe to the RIC 100, and the E2T 102 in RIC 100 may transmit report messages received from RAN node #1 412, RAN node #2 414, and RAN node #3 416 to App #A 402.

Referring to FIG. 4B, the RIC 100 may be connected with a very large number of (e.g., 100 or more) RAN nodes, for example, RAN node #1 422, RAN node #2 424, and RAN node #N 428 through the E2T 102, and RAN node #1 422, RAN node #2 424, and RAN node #N 428 may transmit report messages to the RIC 100 through a subscription procedure. The E2T 102 of the RIC 100 may transmit the report messages to an on-going application (App #A-1) 404 and a newly generated application (App #A-2) 406. App #A-2 406 is an application executing the same function as App #A-1 404, and may be generated, when overload of App #A-1 404 is detected in the RIC 100.

In an embodiment, upon detection of lack of resources in App #A-1 404 during reception of report messages from RAN Node #1 422, RAN Node #2 424, and RAN Node #N 428, the RIC 100 may generate (and deploy) App #A-2 406 executing the same function as App #A-1 404, and distribute existing load to App #A-1 404 and App #A-2 406 using scale-out.

In an embodiment, after generating (and deploying) App #A-2 406 capable of executing the same function as App #A-1 404, the RIC may delete a transmission and reception configuration for some (e.g., RAN node #51 to RAN node #100) of existing total RAN nodes (e.g., RAN node #1 to RAN node #100) subscribed to App #A-1 404 through a partial unsubscribing procedure for App #A-1 404.

In an embodiment, the RIC 100 may perform a data transmission and reception configuration between App #A-2 406 and the partial RAN nodes (e.g., RAN node #51 to RAN node #100) unsubscribed from App #A-1 404 by performing a subscription procedure with App #A-2 406, for the partial RAN nodes (e.g., RAN node #51 to RAN node #100). App #A-1 404 and App #A-2 406 may transmit report messages from the RAN nodes 422, 424, and 428 through the E2T 102 by subscription to the RIC 100. For example, report messages from some RAN nodes (e.g., RAN node #51 to RAN node #100) may be transmitted to App #A-2 406, and report messages from the remaining RAN nodes (e.g., RAN node #1 to RAN node #50) may be transmitted to App #A-1 404.

App #A-1 404 and App #A-2 406 may process the report messages by the same function.

The following example problems may occur in scale-out through the above-described subscription and unsubscribing.

For example, the entire scale-out process may be delayed due to consumption of time and resources for subscription and unsubscribing in the scale-out process.

For example, during unsubscribing of some RAN nodes, a report message from one of the partial RAN nodes may be dropped in the E2T 102, or may be duplicately transmitted to App #A-1 404 and App #A-2 406, leading to an unnecessary operation of processing duplicate data in App #A-1 404 and App #A-2 406. Moreover, for example, when a time interval for providing report data from RAN nodes connected with the RIC 100 to App #A-1 404 is short or the size of the report data is large, it may be impossible to perform scale-out for the function of App #A-1 404.

For example, when the RIC 100 does not have knowledge of the amount of load of applications, and each application is responsible for determining whether to distribute the load of the applications, a plurality of applications individually perform distributed processing by scale-out. Therefore, the RIC may fail or malfunction in operating resources.

The following embodiments may provide scalability and distributed processing for applications while maintaining low latency and connection continuity in a RIC (e.g., the RIC 100) according to the O-RAN standard in a communication network to which ultra-low latency connectivity is important. The following embodiments may provide a scale-out function that enables massive high-speed data processing of applications in a RIC, thereby minimizing and/or reducing failure of the RIC and increasing the processing efficiency of the individual applications.

The embodiments to be described below may provide a scale-out technique of processing report data (load) received from a plurality of RAN nodes connected with an E2T (e.g., the E2T 102) managing SCTP connections between a RIC (e.g., the RIC 100) and the RAN nodes by a single application in the RIC.

The embodiments to be described below may support smooth operations of applications by reducing time delay, data redundancy, or data loss in scale-out of the applications in a RIC.

Figure 5:
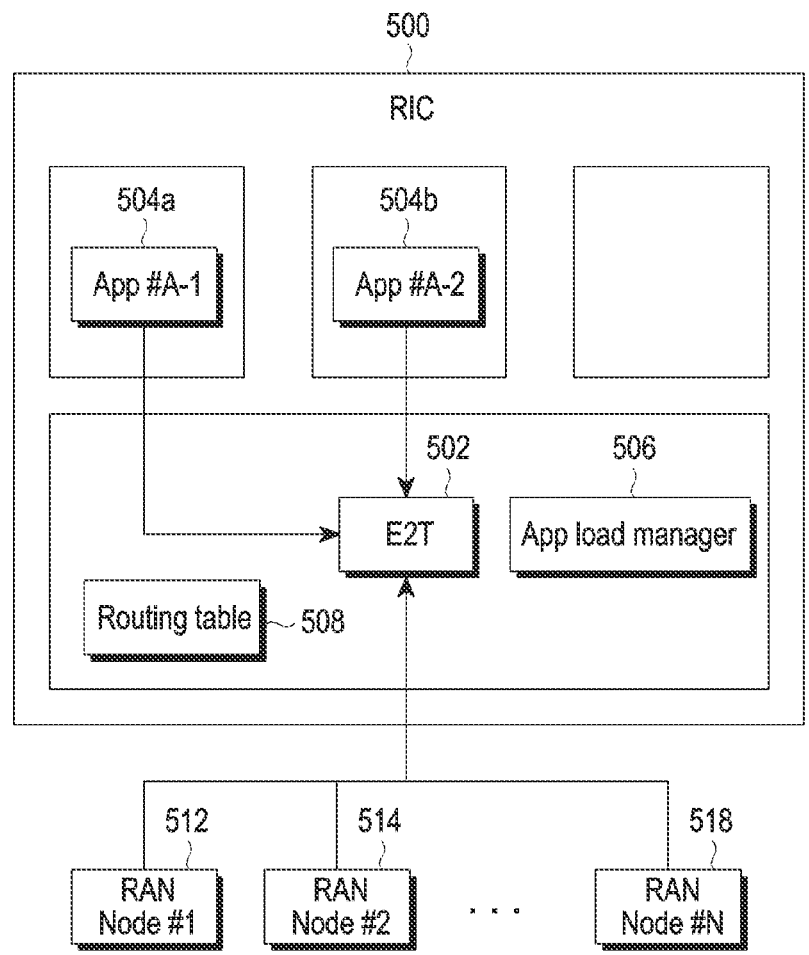
FIG. 5 is a diagram illustrating an example structure of a RIC supporting massive data processing in an O-RAN according to one embodiment.

FIG. 5 is a diagram illustrating an example structure of a RIC supporting massive data processing in an O-RAN according to one embodiment.

Referring to FIG. 5, a RIC 500 may include an E2T 502 responsible for routing between at least one application (e.g., App #A-1 504a and App #A-2 504b) and RAN nodes (e.g., RAN node #1 512, RAN node #2 514, and RAN node #N 518), and an App load manager 506 that manages load. In an embodiment, an E2T 502 and the at least one application (e.g., App #A-1 504a and App #A-2 504b) may be the same as to similar to the foregoing description.

In an embodiment, the at least one application (e.g., App #A-1 504a and App #A-2 504b) is an application executable by the RIC 500, and may exchange messages with the RAN nodes 512, 514, and 518 through the E2T 502 defined in the O-RAN RIC standard. In an embodiment, the at least one application (e.g., App #A-1 504a and App #A-2 504b) may operate in a virtual cluster environment (e.g., Kubernetes).

In an embodiment, the App load manager 506 may be responsible of monitoring resources and determining scale-out for at least one application (e.g., App #A-1 504a). In an embodiment, the App load manager 506 may be implemented as a separate and independent module as illustrated. However, in another embodiment, the App load manager 506 may be integrated with another module (e.g., the E2T 502 or an App subscription manager (not shown)).

In an embodiment, the App load manager 506 may monitor the at least one application (e.g., App #A-1 504a and App #A-2 504b), predict and measure overload, and manage a routing table 508 referred to by the E2T 502. The E2T 502 may refer to the routing table 508 to route report messages from the RAN nodes 512, 514, and 518 to the at least one application (e.g., App #A-1 504a and App #A-2 504b).

In an embodiment, the App load manager 506 may monitor resources being used by the at least one application (e.g., App #A-1 504a and App #A-2 504b). In an embodiment, the resources may include at least one of a central processing unit (CPU) usage, a message drop rate, a message latency, or a memory usage for each application.

In an embodiment, the App load manager 506 may predict overload of each application based on the monitoring and determine whether to perform scale-out. In an embodiment, the App load manager 506 may determine an application for which scale-out is to be performed according to a round robin algorithm.

In an embodiment, a routing table 508 may be generated by performing RIC subscription (e.g., operations 304 and 306) and/or RIC indication (e.g., operation 310) in the E2T 502. The routing table 508 may include subscription information (e.g., a RIC request ID) about each application (e.g., App #A-1 504a and App #A-2 504b) running in the RIC 500, and an endpoint indicating at least one RAN node (e.g., at least one of the RAN nodes 512, 514, and 518) mapped to each application.

In an embodiment, the E2T 502 may receive a report message from a specific RAN node (e.g., RAN node #1 512), identify an application (e.g., App #A-1 504a) mapped to RAN node #1 512, referring to the routing table 508, and route the report message to the identified App #A-1 504a.

In an embodiment, the RIC 500 may generate the routing table 508 related to RIC subscription/indication for use in the E2T 502. In a situation in which only App #A-1 504a is being executed in the RIC 500, an example of the routing table 508 may be as illustrated in FIG. 6A.

Referring to FIG. 6A, the routing table 508 may include the following items.

A RIC request ID item 602 is a logical ID used to identify a specific RIC subscription in the RIC 500, and may indicate the type of information that an application (e.g., App #A-1 504a) running in the RIC 500 intends to receive from the RAN nodes 512, 514, and 518 (e.g., e.g., including RAN node #1, RAN node #2, . . . RAN node #99, and RAN node #100).

In an embodiment, the RIC 500 may include and transmit a first RIC request ID in a RIC subscription request message to a specific RAN node (e.g., a first RAN node that is any one of the RAN nodes 512, 514, and 518) (e.g., in operation 304 of FIG. 3), and receive a RIC subscription response message including the first RIC request ID from the first RAN node (e.g., in operation 306 of FIG. 3). When the RIC 500 successfully completes a subscription procedure for the first RAN node by exchanging a RIC subscription request message and a RIC subscription response message with the first RAN node, the RIC 500 may add new entries related to the subscription of the first RAN node (e.g., the first RIC request ID, a RAN node name of the first RAN node, and an endpoint indicating an application (e.g., xApp #A-1) for performing an operation related to the first RAN node) to the routing table 508.

A RAN node item 604 may include a name or ID indicating a RAN node subscribed to the RIC 500.

An App EndPoint item 606 is a communication endpoint indicating an application subscribed to or running in the RIC 500, and may be, for example, an Internet protocol (IP) address.

Referring to FIG. 6A, the routing table 508 may include the RAN node item 604 for RAN node #1, RAN node #2, . . . RAN node #99, and RAN node #100, for a value '1' of the RIC request ID item 602, and the App EndPoint item 606 may indicate App #A-1 504a for the RAN node item 604 of RAN node #1, RAN node #2, . . . RAN node #99, and RAN node #100.

According to the routing table 508 configured as illustrated in FIG. 6A, the E2T 502 may transmit report messages from the RAN nodes 512, 514, and 518 (e.g., RAN Node #1, RAN Node #2, . . . RAN Node #99, and RAN node #100) to App #A-1 504a.

In an embodiment, the App load manager 506 may detect the overload of the App #A-1 504a running in the RIC 500. In an embodiment, the App load manager 506 may determine whether overload has occurred in App #A-1 504a based on at least one of the remainder of a reception buffer queue available for communication in App #A-1 504a, the remainder of a transmission buffer queue, a message drop rate being the ratio of unprocessed messages of App #A-1 504a to total received messages, a message latency, a CPU state, a random access memory (RAM) state, a network input/output (I/O) state, or a disk I/O state.

In an embodiment, upon detecting the overload, the App load manager 506 may determine to perform scale-out for App #A-1 504a and generate a new application (e.g., App #A-2 504b). In an embodiment, the RIC 500 may include a component (e.g., an App manager (not shown)) for managing applications, and when the App load manager 506 detects the overload of App #A-1 504a, may request the App manager to generate App #A-2 504b. In an embodiment, App #A-2 504b may execute the same functions as App #A-1 504a (e.g., network intelligence, network optimization and control, using report data from the RAN nodes 512, 514, 518).

In an embodiment, RIC 500 may generate App #A-2 504b and update the routing table 508 to include connectivity information related to App #A-2 504b. In an embodiment, the RIC 500 may include a component (e.g., a routing table manager (not shown)) responsible for managing the routing table 508, and as App #A-2 504b is generated, may transmit the connectivity information related to App #A-2 504b to the routing table manager, and the connectivity information may be reflected in the routing table 508.

According to an embodiment, an example of the connectivity information related to App #A-2 504b, included in the routing table 508 may be as illustrated in FIG. 6B.

Referring to FIG. 6B, the routing table 508 may include the RAN node item 604 of RAN node #1, RAN node #2, . . . RAN node #99, and RAN node #100, for the value '1' of the RIC request ID item 602. Although the App EndPoint item 606 for RAN node #1, RAN node #2, . . . RAN node #50 still indicates App #A-1 504a, the App EndPoint item 606 for RAN node #51, RAN node #52, . . . , RAN node #100 may be updated with a value 608 indicating App #A-2 504b.

In an embodiment, as the E2T 502 of the RIC 500 uses, for example, the routing table 508 updated as illustrated in FIG. 6B, the E2T 502 may route report messages from RAN Node #1, RAN Node #2, . . . , Ran node #50 to App #A-1 504a and route report messages from RAN Node #51, RAN Node #52, . . . , RAN Node #100 to App #A-2 504b, thereby distributing load concentrated on App #A-1 504a.

In the above-described embodiments, the RIC 500 may skip subscription reconfiguration related to applications (e.g., unsubscribing from App #A-1 504a and subscription to App #A-2 504b), and enable App #A-1 504a and App #A-2 504b to seamlessly process report messages received from the RAN nodes 512, 514, and 518. Through the above-described operations, the load of App #A-1 504a may be distributed without changing the data transmission/reception operations between App #A-1 504a and App #A-2 504b, and the RAN nodes 512, 514, and 518.

In an embodiment, the RIC 500 may distribute the load of App #A-1 504a to N applications in the similar manner as described above.

Figure 7:
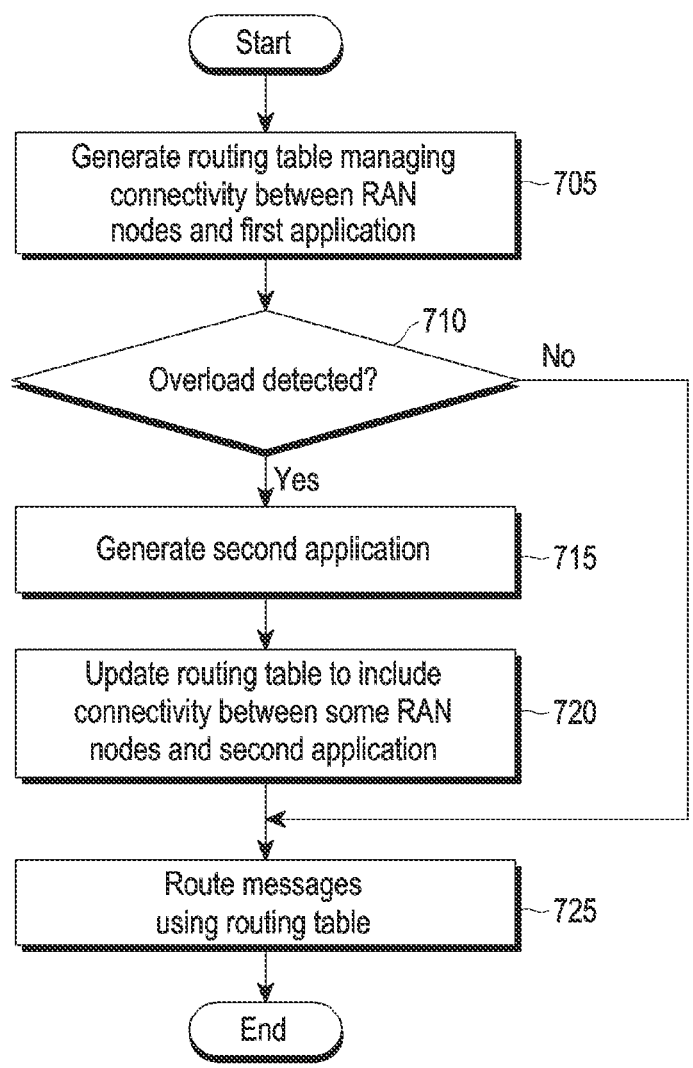
FIG. 7 is a flowchart illustrating an example operation of distributing massive data in a RIC according to one embodiment.

FIG. 7 is a flowchart illustrating an example operation of distributing massive data in the RIC 500 according to one embodiment.

Referring to FIG. 7, in operation 705, the RIC 500 may generate a routing table (e.g., the routing table 508) managing connectivity between RAN nodes (e.g., RAN node #1 to RAN node #100) and a first App (e.g., App #A-1 504a). In an embodiment, the routing table 508 may be configured as illustrated in FIG. 6A. In an embodiment, the routing table 508 may be generated and/or updated by performing RIC subscription for at least one RAN node. For example, the RIC 500 may add the name or ID of RAN node #1 512 and a corresponding endpoint entry (e.g., App #A-1 504a) to the routing table 508 by performing the RIC subscription procedure with the at least one RAN node (e.g., RAN node #1 512) as in operations 302, 304, and 306 of FIG. 3.

In operation 710, the RIC 500 (e.g., the App load manager 506 of the RIC 500) may monitor the resource state of a first application running in the RIC 500, and detect the overload of the first application. In an embodiment, the overload of the first application may be detected according to at least one of a condition that the remainder of the reception buffer queue of the RIC 500 is less than a specified threshold, a condition that the remainder of the transmission buffer queue of the RIC 500 is less than a specified threshold, a condition that the message drop rate of the first application is larger than a specified threshold, a condition that a message latency is larger than a specified threshold, a condition that a CPU state is overload, a condition that a RAM state is overload, a condition that a network I/O state is overload, or a condition that a disk I/O state is overload.

When the overload of the first application is not detected ("No" in operation 710), the RIC 500 (e.g., the E2T 502 of the RIC 500) may route report messages from the RAN nodes (e.g., RAN nodes #1 to RAN node #100) to the first application according to the routing table in operation 725.

Upon detection of the overload of the first application, the RIC 500 ("Yes" in operation 710) may proceed to operation 715.

In operation 715, the RIC 500 may generate a second application for distributing the load of the first application. In an embodiment, the RIC 500 may additionally execute the second application executing the same function as the first application.

In operation 720, the RIC 500 may update the routing table 508 to include connectivity between some (e.g., RAN node #51 to RAN node #100) of the existing RAN nodes (e.g., RAN node #1 to RAN node #100) and the second application. The RIC 500 may change endpoint entries for the partial RAN nodes (e.g., RAN node #51 to RAN node #100) from the first application to the second application. In an embodiment, the updated routing table 508 may be configured as illustrated in FIG. 6B.

In an embodiment, the partial RAN nodes may be selected according to a condition given by the RIC 500. In an embodiment, a given ratio (e.g., 50%) of RAN nodes among a plurality of RAN nodes mapped to the first application may be remapped to the second application by the updated routing table 508.

In operation 725, the RIC 500 (e.g., the E2T 502 of the RIC 500) may route report messages from RAN node #1 to RAN node #100 to the first application and the second application according to the updated routing table 508. For example, the E2T 502 of the RIC 500 may transmit a report message received from any one of RAN node #1 to RAN node #50 to the first application. Further, the E2T 502 of the RIC 500 may transmit a report message received from any one of RAN node #51 to RAN node #100 to the second application.

Through the above-described operations, the RIC 500 may seamlessly distribute report messages from the RAN nodes to scaled-out applications using the change of the routing table 508 without using the subscription and/or unsubscribing procedure.

FIGS. 8A, 8B, 8C, and 8D are diagrams illustrating an example procedure of performing distributed processing for massive data in the RIC 500 according to one embodiment.

Figure 8A:
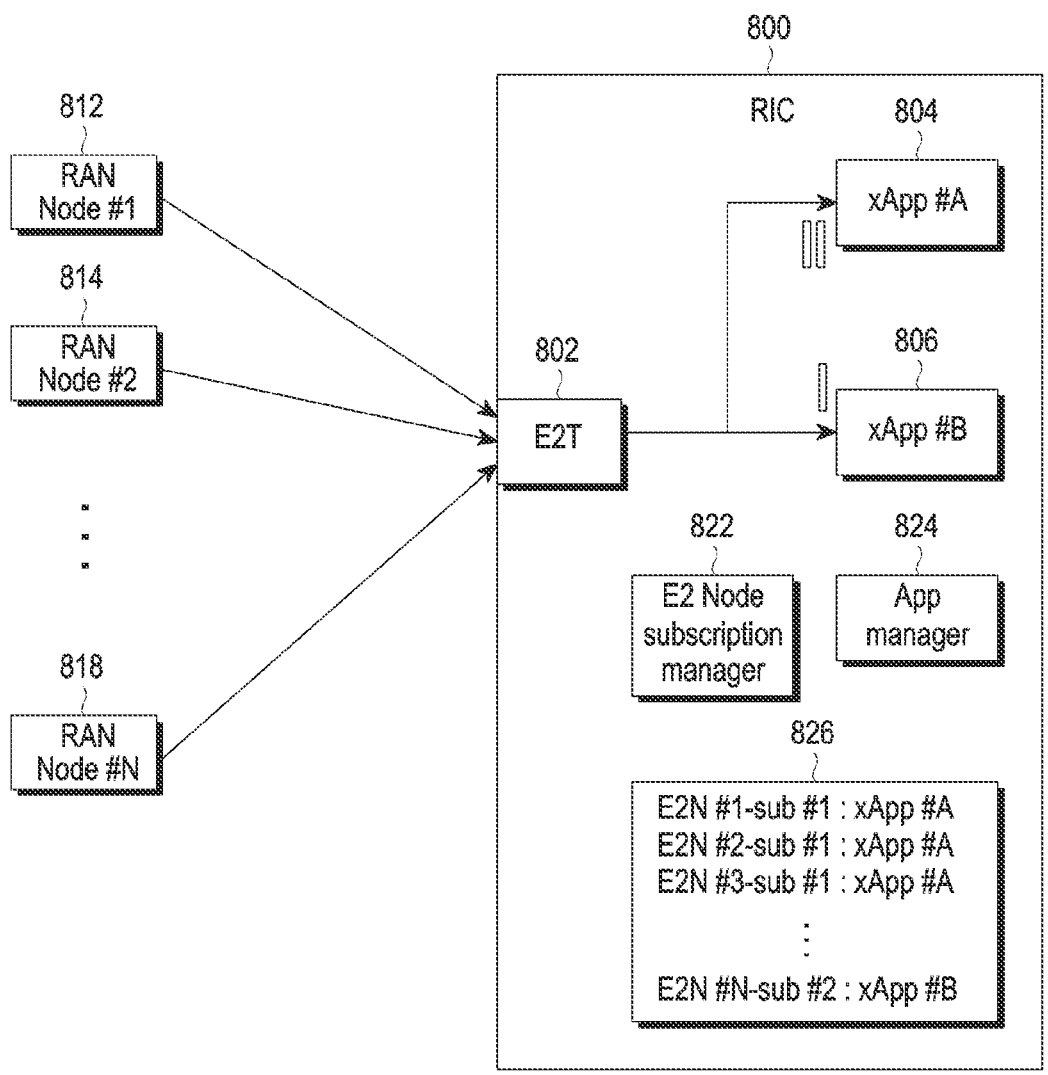
FIGS. 8A, 8B, 8C, and 8D are diagrams illustrating an example procedure of performing distributed processing for massive data in the RIC according to one embodiment.

Referring to FIG. 8A, a RIC 800 (e.g., the RIC 500) may host at least one application, for example, xApp #A 804 and xApp #B 806, and may be connected with a plurality of RAN nodes, for example, RAN node #1 812, RAN node #2 814, . . . , and RAN node #N 818 through an E2T 802 (e.g., the E2T 502).

In an embodiment, the RIC 800 may include an E2 node subscription manager 822 for managing subscriptions of RAN node #1 812, RAN node #2 814, . . . , and RAN node #N 818 over an E2 interface. The E2 node subscription manager 822 may change RAN node information and endpoint entries in a routing table 826, when RAN node #1 812, RAN node #2 814, . . . , and RAN node #N 818 subscribe to or unsubscribe from the RIC 800. In an embodiment, the RIC 800 may include an App manager 824 that manages xApp #A 804 and xApp #B 806 hosted by the RIC 800. The App manager 824 may change endpoint entries of the routing table 826, when xApp #A 804 and xApp #B 806 subscribe to or unsubscribe from the RIC 800 (or when xApp #A 804 and xApp #B 806 run or stop running in the RIC 800).

In an embodiment, the routing table 826 may store RAN node information indicating a plurality of RAN nodes subscribed to the RIC 800 and an endpoint entry corresponding to each RAN node. For example, RAN Node #1 812 may be stored under a RAN node name of E2N #1, be identified by a RIC request ID of sub #1, and have an endpoint indicating xApp #A 804. For example, RAN node #2 814 may be stored under a RAN node name of E2N #2, be identified by the RIC request ID of sub #1, and have an endpoint indicating xApp #A 804. For example, RAN node #N 818 may be stored under a RAN node name of E2N #N, be identified by a RIC request ID of sub #2, and have an endpoint indicating xApp #B 806.

The routing table 826 may be referred to by the E2T 802. When receiving a report message from at least one (e.g., RAN node #1 812) of the RAN nodes 812, 814, and 818, the E2T 802 may identify the endpoint of RAN node #1 812 from the routing table 826 and route the report message to xApp #A 804 corresponding to the identified endpoint.

Figure 8B:
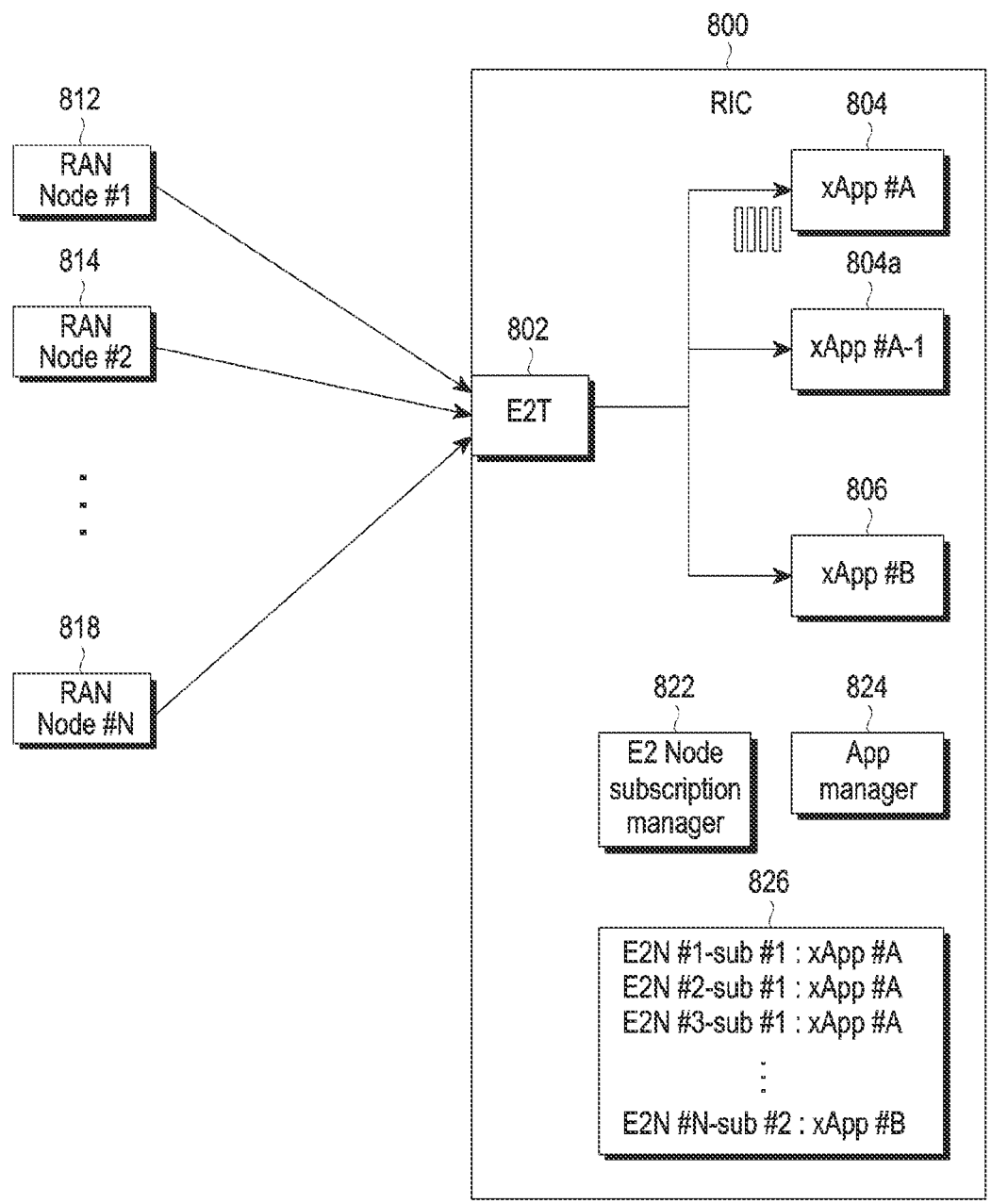

Referring to FIG. 8B, the RIC 800 may detect overload of xApp #A 804. In an embodiment, as the App manager 824 of the RIC 800 detects that data (e.g., report messages) equal to or larger than a specified threshold is buffered in a reception buffer queue for xApp #A 804, the App manager 824 may determine the overload of xApp #A 804. According to the detection of the overload, the RIC 800 may generate xApp #A-1 804a for distributed processing of xApp #A 804. In an embodiment, the App manager 824 may generate xApp #A-1 804a according to the detection of the overload.

Figure 8C:
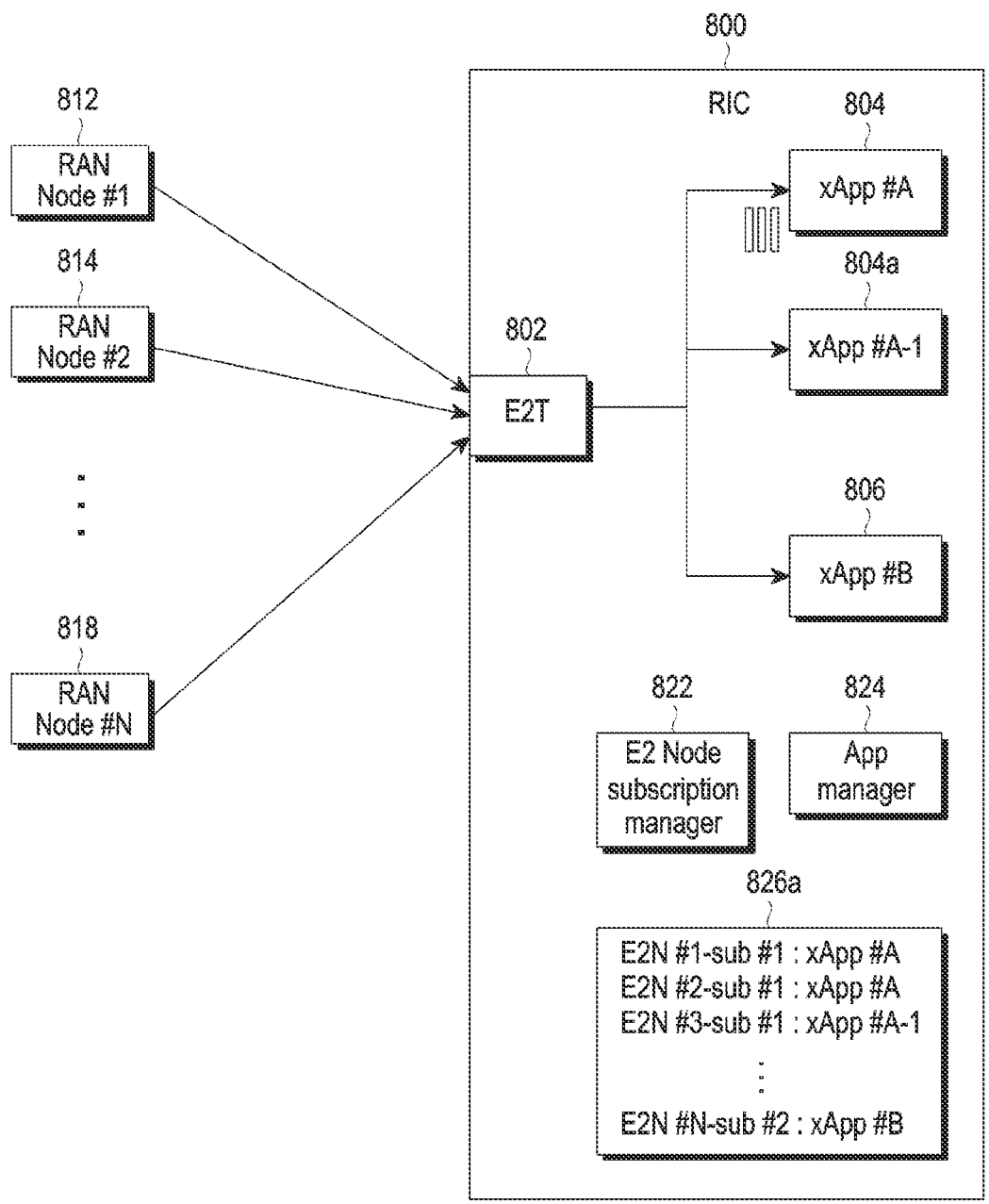

Referring to FIG. 8C, the RIC 800 may update the routing table 826 to include connectivity information about xApp #A-1 804a. The routing table 826 may be updated to a routing table 826a. In an embodiment, the RIC 800 may change the endpoint entries of some RAN nodes having xApp #A 804 as endpoints (e.g., including RAN node #3 identified as E2N #3) to xApp #A-1 804a.

Figure 8D:
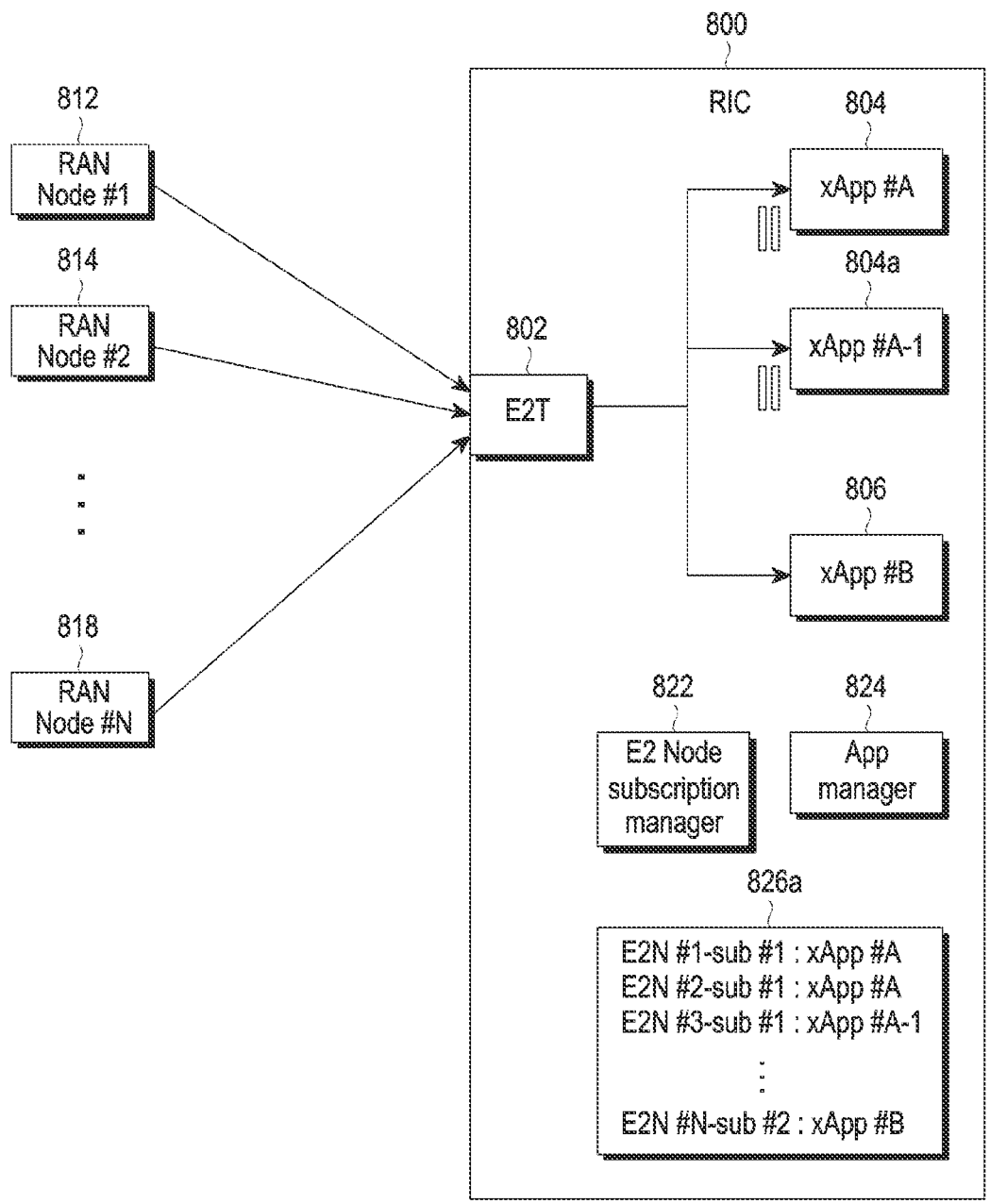

Referring to FIG. 8D, the E2T 802 of RIC 800 may distribute report messages from RAN nodes 812, 814, and 818 to xApp #A 804 and xApp #A-1 804a according to the updated routing table 826a. In an embodiment, upon receipt of a report message from at least one (e.g., RAN node #1 812) of the RAN nodes 812, 814, and 818, the E2T 802 may identify the endpoint of RAN node #1 812 from the routing table 826a, and route the report message to xApp #A 804 corresponding to the identified endpoint. In an embodiment, upon receipt of a report message from at least one (e.g., RAN node #3) of the RAN nodes 812, 814, and 818, the E2T 802 may identify the endpoint of RAN node #3 from the routing table 826a and route the report message to xApp #A-1 804a corresponding to the identified endpoint.

Figure 9:
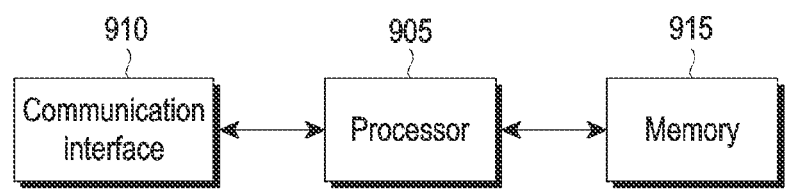
FIG. 9 is a block diagram illustrating an example configuration of an electronic device configured to operate as a RIC in an O-RAN according to one embodiment.

FIG. 9 is a block diagram illustrating an example configuration of an electronic device configured to operate as a RIC in an O-RAN according to one embodiment.

Referring to FIG. 9, a RIC (e.g., the RIC 500 or the RIC 800) may include a processor (e.g., including processing circuitry) 905, a communication interface (e.g., including communication circuitry) 910, and a memory 915. In an embodiment, the processor 905 may include (or execute) at least one application (e.g., APP #A-1 504a, APP #A-2 504b, xApp #A 804, xApp #A-1 804a, and xApp #A 806), and the communication interface 910 may include the E2T 802 connected to at least one RAN node (e.g., RAN node #1 812, RAN node #2 814, and RAN node #N 818). The memory 915 may include the routing table 826 referred to by the E2T 802.

Upon detection of overload of xApp #A 804, the processor 905 may generate xApp #A-1 804a capable of executing the same function as xApp #A 804, and generate the updated routing table 826a to include an endpoint entry of xApp #A-1 804a. The E2T 802 included in the communication interface 910 may transmit (e.g., route) report messages from some RAN nodes to xApp #A 804 and transmit report messages from other RAN nodes to xApp #A-1 804a, referring to the updated routing table 826a.

According to an embodiment, an electronic device configured to operate as a radio access network (RAN) intelligent controller (RIC) in an open radio access network (O-RAN) may include: a communication interface comprising communication circuitry configured to support an E2 interface, and a processor operatively coupled with the communication interface. The processor may be configured to store the routing table for managing connectivity between a first application and the plurality of RAN nodes configured to communicate with the RIC over the E2 interface. The processor may be configured to detect overload of the first application, and generate a second application for executing a same function as the first application. The processor may be configured to update the routing table to include connectivity between at least one of the plurality of RAN nodes and the second application. The processor may be configured to control the communication interface to forward messages from the plurality of RAN nodes to the first application and the second application based on the updated routing table.

In an example embodiment, the routing table may include a RIC request ID item, a RAN node item identifying the plurality of RAN nodes, and an endpoint item indicating the first application or the second application communicating with each RAN node.

In an example embodiment, the processor may be configured to detect the overload of the first application based on at least one of a remainder of a reception buffer queue, a remainder of a transmission buffer queue, a message drop rate, a message latency, a CPU state, a RAM state, a network I/O state, or a disk I/O state.

In an example embodiment, the processor may be configured to include an App load manager configured to monitor resource use of the first application and determine the overload.

In an example embodiment, the communication interface may include an E2 termination coupling with the plurality of RAN nodes to the RIC over the E2 interface.

In an example embodiment, the RIC may include a near-real-time RIC. At least one of the first application and the second application may include software hosted by the near-real-time RIC.

In an embodiment, the plurality of RAN nodes may include at least one of an NE, an RU, a DU, a CU-CP, or a CU-UP.

In an embodiment, the processor may be configured to transmit a subscription request message including a first RIC request ID to a first RAN node among the plurality of RAN nodes, receive a subscription response message including the first RIC request ID from the first RAN node, and add the first RIC request ID, a RAN node name of the first RAN node, and an endpoint indicating the first application related to the first RAN node to the routing table.

In an embodiment, the communication interface may be configured to communicate with each of the plurality of RAN nodes, using an SCTP having a persistent connection.

In an embodiment, the communication interface may be configured to route report data from a first RAN node among the plurality of RAN nodes to the first application, and route report data from a second RAN node among the plurality of RAN nodes to the second application, based on the updated routing table.

According to an embodiment, a method performed by a RIC in O-RAN may include storing (705) a routing table for managing connectivity between a first application and a plurality of RAN nodes configured for communicating with the RIC over an E2 interface. The method may include detecting (710) overload of the first application, and generating (715) a second application configured to execute a same function as the first application. The method may include updating (720) the routing table to include connectivity between at least one of the plurality of RAN nodes and the second application. The method may include forwarding (725) messages from the plurality of RAN nodes to the first application and the second application based on the updated routing table.

In an embodiment, the routing table may include a RIC request ID item, a RAN node item identifying the plurality of RAN nodes, and an endpoint item indicating the first application or the second application communicating with each RAN Node.

In an embodiment, the detection may include determining the overload of the first application based on at least one of a remainder of a reception buffer queue, a remainder of a transmission buffer queue, a message drop rate, a message latency, a CPU state, a RAM state, a network I/O state, or a disk I/O state.

In an embodiment, the RIC may include an application load manager configured to monitor resource use of the first application and determine the overload.

In an embodiment, the RIC may include a communication interface which includes an E2 termination coupling with the plurality of RAN nodes to the RIC over the E2 interface.

In an embodiment, the RIC may include a near-real-time RIC. At least one of the first application and the second application may include software hosted by the near-real-time RIC.

In an embodiment, the plurality of RAN nodes may include at least one of an NE, an RU, a DU, a CU-CP, or a CU-UP.

In an example embodiment, a method may include: transmitting a subscription request message including a first RIC request ID to a first RAN node among the plurality of RAN nodes, receiving a subscription response message including the first RIC request ID from the first RAN node, and adding the first RIC request ID, a RAN node name of the first RAN node, and an endpoint indicating the first application related to the first RAN node to the routing table.

In an example embodiment, the RIC may be configured to communicate with each of the plurality of RAN nodes, using an SCTP having a persistent connection.

In an example embodiment, the RIC may be configured to route report data from a first RAN node among the plurality of RAN nodes to a first application, and route report data from a second RAN node among the plurality of RAN nodes to a second application, based on the updated routing table.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "coupled with," or "coupled to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., the electronic device 500). For example, a processor (e.g., the processor 905) of the machine (e.g., the electronic device 500) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be avoided, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or avoided, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device configured to operate as a radio access network (RAN) intelligent controller (RIC) in an open radio access network (O-RAN), the electronic device comprising:
  a communication interface comprising communication circuitry configured to support an E2 interface; and
  a processor, comprising processing circuitry, operatively coupled with the communication interface,
  wherein the processor is configured to:
    store a routing table for managing connectivity between a first application and a plurality of RAN nodes configured to communicate with the RIC over the E2 interface, detect an overload of the first application,
    generate a second application configured to execute a same function as the first application,
    update the routing table to include connectivity between at least one of the plurality of RAN nodes and the second application, and
    control the communication interface to forward messages from the plurality of RAN nodes to the first application and the second application based on the updated routing table.

2. The electronic device of claim 1, wherein the routing table includes:
  a RIC request identifier (ID) item,
  a RAN node item identifying the plurality of RAN nodes, and
  an endpoint item indicating the first application or the second application communicating with each RAN node.

3. The electronic device of claim 1, wherein the processor is configured to:
  detect the overload of the first application based on at least one of a remainder of a reception buffer queue, a remainder of a transmission buffer queue, a message drop rate, a message latency, a central processing unit (CPU) state, a random access memory (RAM) state, a network input/output state, or a disk input/output state.

4. The electronic device of claim 1, wherein the processor includes an application load manager configured to:
  monitor resource use of the first application and determine the overload.

5. The electronic device of claim 1, wherein the communication interface includes an E2 termination coupling with the plurality of RAN nodes over the E2 interface.

6. The electronic device of claim 1, wherein the RIC includes a near-real-time RIC, and
  wherein the first application and the second application include software hosted by the near-real-time RIC.

7. The electronic device of claim 1, wherein the plurality of RAN nodes include at least one of a network element (NE), a radio unit or remote unit (RU), a distributed unit (DU), a central unit-control plane (CU-CP), or a central unit-user plane (CU-UP).

8. The electronic device of claim 1, wherein the processor is configured to:
   transmit a subscription request message including a first RIC request ID to a first RAN node among the plurality of RAN nodes,
   receive a subscription response message including the first RIC request ID from the first RAN node, and
   add the first RIC request ID, a RAN node name of the first RAN node, and an endpoint indicating the first application related to the first RAN node to the routing table.

9. The electronic device of claim 1, wherein the communication interface is configured to communicate with each of the plurality of RAN nodes, using a stream control transmission protocol (SCTP) having a persistent connection.

10. The electronic device of claim 1, wherein the communication interface is configured to:
    route report data from a first RAN node among the plurality of RAN nodes to the first application, and route report data from a second RAN node among the plurality of RAN nodes to the second application, based on the updated routing table.

11. A method performed by a radio access network (RAN) intelligent controller (RIC) in an open radio access network (O-RAN), the method comprising:
    storing a routing table for managing connectivity between a first application and a plurality of RAN nodes configured to communicate with the RIC over an E2 interface;
    detecting an overload of the first application;
    generating a second application configured to execute a same function as the first application;
    updating the routing table to include connectivity between at least one of the plurality of RAN nodes and the second application; and
    forwarding messages from the plurality of RAN nodes to the first application and the second application based on the updated routing table.

12. The method of claim 11, wherein the routing table includes:
    a RIC request identifier (ID) item,
    a RAN node item identifying the plurality of RAN nodes, and
    an endpoint item indicating the first application or the second application communicating with each RAN Node.

13. The method of claim 11, wherein the detecting comprises:
    determining the overload of the first application based on at least one of a remainder of a reception buffer queue, a remainder of a transmission buffer queue, a message drop rate, a message latency, a central processing unit (CPU) state, a random access memory (RAM) state, a network input/output state, or a disk input/output state.

14. The method of claim 11, wherein the RIC includes at least one of: an application load manager configured to monitor resource use of the first application and determine the overload.

15. The method of claim 11, wherein the RIC includes a communication interface including an E2 termination coupling with the plurality of RAN nodes over the E2 interface.

16. The method of claim 11, wherein the RIC includes a near-real-time RIC, and
    wherein the first application and the second application include software hosted by the near-real-time RIC.

17. The method of claim 11, wherein the plurality of RAN nodes include at least one of a network element (NE), a radio unit or remote unit (RU), a distributed unit (DU), a central unit-control plane (CU-CP), or a central unit-user plane (CU-UP).

18. The method of claim 11, further comprising:
    transmitting a subscription request message including a first RIC request ID to a first RAN node among the plurality of RAN nodes,
    receiving a subscription response message including the first RIC request ID from the first RAN node, and
    adding the first RIC request ID, a RAN node name of the first RAN node, and an endpoint indicating the first application related to the first RAN node to the routing table.

19. The method of claim 11, wherein the RIC is configured to communicate with each of the plurality of RAN nodes, using a stream control transmission protocol (SCTP) having a persistent connection.

20. The method of claim 11, wherein the RIC is configured to: route report data from a first RAN node among the plurality of RAN nodes to the first application, and route report data from a second RAN node among the plurality of RAN nodes to the second application, based on the updated routing table.

* * * * *